United States Patent
Avrashi et al.

(10) Patent No.: US 11,494,363 B1
(45) Date of Patent: Nov. 8, 2022

(54) SYSTEM, METHOD, AND COMPUTER PROGRAM FOR IDENTIFYING FOREIGN KEYS BETWEEN DISTINCT TABLES

(71) Applicant: Amdocs Development Limited, Limassol (CY)

(72) Inventors: Yaniv Avrashi, Petach Tikva (IL); Gilli Shama, Ra'anana (IL); Irit Shamir, Zichron Yaakov, IL (US); Pavel Vodolazov, Petah Tikva (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/199,287

(22) Filed: Mar. 11, 2021

(51) Int. Cl.
*G06F 16/22* (2019.01)
*G06F 17/18* (2006.01)
*G06F 16/27* (2019.01)

(52) U.S. Cl.
CPC .......... *G06F 16/2282* (2019.01); *G06F 16/27* (2019.01); *G06F 17/18* (2013.01)

(58) Field of Classification Search
CPC .. G06F 16/2456; G06F 16/2282; G06F 16/27; G06F 17/18
See application file for complete search history.

(56) References Cited

U.S. PATENT DOCUMENTS

| 7,647,293 | B2* | 1/2010 | Brown | G06F 16/24547 |
| | | | | 707/999.002 |
| 7,792,823 | B2* | 9/2010 | Cain | G06F 16/24545 |
| | | | | 707/715 |
| 8,386,529 | B2 | 2/2013 | Chaudhuri et al. | |
| 9,251,204 | B2* | 2/2016 | Collins | G06F 16/24542 |
| 9,471,607 | B2* | 10/2016 | Abed | G06F 16/21 |
| 9,552,379 | B2 | 1/2017 | Pejathaya et al. | |
| 9,971,805 | B2* | 5/2018 | Anantharajaiah | |
| | | | | G06F 16/24544 |
| 10,489,355 | B1* | 11/2019 | Messmer | G06F 16/211 |
| 10,691,651 | B2 | 6/2020 | Harrison et al. | |
| 11,188,571 | B1* | 11/2021 | Chen | G06F 16/2246 |
| 2004/0162832 | A1* | 8/2004 | Dettinger | G06F 16/284 |
| 2007/0005658 | A1 | 1/2007 | Myllymaki | |
| 2007/0130116 | A1* | 6/2007 | Cras | G06F 16/2428 |
| 2007/0156712 | A1* | 7/2007 | Wasserman | G06F 16/284 |
| 2009/0182720 | A1* | 7/2009 | Cain | G06F 16/24545 |
| 2011/0320435 | A1* | 12/2011 | Collins | G06F 16/24542 |
| | | | | 707/718 |
| 2012/0005153 | A1* | 1/2012 | Ledwich | G06Q 10/06 |
| | | | | 707/602 |

(Continued)

FOREIGN PATENT DOCUMENTS

| CN | 108733793 | A | 11/2018 |
| CN | 109472013 | A | 3/2019 |
| CN | 111949663 | A | 11/2020 |

*Primary Examiner* — Merilyn P Nguyen
(74) *Attorney, Agent, or Firm* — Zilka-Kotab, P.C.

(57) ABSTRACT

As described herein, a system, method, and computer program are provided for identifying foreign keys between distinct tables based on a statistical analysis of table values. In use, a plurality of candidate field combinations are determined between a first table and a second table. A statistical analysis of values stored in fields of each candidate field combination of the plurality of the candidate field combinations is performed. Foreign keys between the first table and the second table are identified, based on a result of the statistical analysis.

17 Claims, 7 Drawing Sheets

(56) References Cited

U.S. PATENT DOCUMENTS

| | | | | |
|---|---|---|---|---|
| 2014/0280067 A1* | 9/2014 | Ganti | G06F 16/3325 |
| | | | 707/722 |
| 2014/0324876 A1* | 10/2014 | Konik | G06F 16/2282 |
| | | | 707/741 |
| 2015/0254255 A1 | 9/2015 | Trivedi et al. | |
| 2016/0055205 A1* | 2/2016 | Jonathan | G06F 16/2456 |
| | | | 707/714 |
| 2016/0055212 A1* | 2/2016 | Young | G06F 16/2456 |
| | | | 707/723 |
| 2017/0024421 A1* | 1/2017 | Kim | G06F 16/245 |
| 2017/0228425 A1* | 8/2017 | Kandula | G06N 7/005 |
| 2017/0364559 A1* | 12/2017 | Anantharajaiah | G06F 17/18 |
| 2018/0095952 A1* | 4/2018 | Rehal | G06F 16/213 |
| 2019/0050437 A1* | 2/2019 | Goyal | G06F 16/2272 |
| 2020/0004749 A1* | 1/2020 | Slezak | G06N 7/005 |
| 2022/0004532 A1* | 1/2022 | Portisch | G06F 16/2282 |
| 2022/0027379 A1* | 1/2022 | Unterbrunner | G06F 16/254 |

\* cited by examiner

|   | Column1 | Column2 | Column1_Hashed | Column2_Hashed | Hashed_Sum |
|---|---------|---------|----------------|----------------|------------|
| 0 | Value1  | TRUE    | 531535346057393953 | 1 | 531535346057393954 |
| 1 | Value2  | FALSE   | 8070412256565443203 | 0 | 8070412256565443203 |
| 2 | Value3  | TRUE    | -5044626135025862153 | 1 | -5044626135025862153 |
| 3 | Value1  | FALSE   | 531535346057393953 | 0 | 531535346057393953 |
| 4 | Value3  | FALSE   | -5044626135025862153 | 0 | -5044626135025862153 |
| 5 | Value1  | FALSE   | 531535346057393953 | 0 | 531535346057393953 |

FIG. 4A

|   | Hashed_Sum | Frequency |
|---|------------|-----------|
| 0 | 531535346057393954 | 2 |
| 1 | 8070412256565443203 | 1 |
| 2 | -5044626135025862153 | 1 |
| 3 | 531535346057393953 | 1 |
| 4 | -5044626135025862153 | 1 |
| 5 | 531535346057393953 | 1 |

FIG. 4B

|   | Hashed_Sum | Frequency_Table1 | Frequency_Table1 |
|---|------------|------------------|------------------|
| 0 | 531535346057393953 | 2 | 1 |
| 1 | 531535346057393954 | 1 | 1 |
| 2 | 8070412256565443203 | 3 | 1 |
| 3 | -5044626135025862153 | 1 | 1 |
| 4 | -5044626135025862152 | 1 | 1 |

FIG. 4C

| Index | 1 | 2 | 3 | 4 | ... | 1205 | 1206 | 1207 | ... | 24514 | ... | 5000 |
|---|---|---|---|---|---|---|---|---|---|---|---|---|
| value | F | F | F | T | F | F | T | F | F | T | F | F |

SYSTEM, METHOD, AND COMPUTER PROGRAM FOR IDENTIFYING FOREIGN KEYS BETWEEN DISTINCT TABLES

FIELD OF THE INVENTION

The present invention relates to techniques for identifying foreign keys in a table.

BACKGROUND

Relational databases may store bits of information that should be constantly aligned. Data alignment can be within a database or between databases, even in the case where the databases are supporting applications that manage distinct business processes, when some of the information modified during by a business processed managed and stored by one database affects a business process managed and stored by the other database. Data alignment between two tables is done by foreign key (FK). Foreign key is the basis to map database(s), and to join tables together. There are two types of FK: (a) simple FK and (b) composite FK.

A simple foreign key is a pair of fields in respective first and second tables (e.g. field A from table 1 and a field B from table 2) that maps each row in the second table to a unique row in the first table. That is, A identifies table 1 rows with a unique value per row, and the values of B are an exact subset of the A values.

A composite foreign key is a pair of fields in each of the first and second tables (e.g. field A and B from table 1 and a field C and D from table 2) that maps each row in the second table to a unique row in the first table. That is, A and B identify table 1 rows with unique value per row, and the values of C and D are an exact subset of the A and B values.

To date, solutions to identify foreign keys in existing databases have been limited. For example, current solutions typically rely on metadata, such as column names, and/or require identification of a primary key first, and/or do not support composite-key scenarios. There is thus a need for addressing these and/or other issues associated with the prior art.

SUMMARY

As described herein, a system, method, and computer program are provided for identifying foreign keys between distinct tables based on a statistical analysis of table values. In use, a plurality of candidate field combinations are determined between a first table and a second table. A statistical analysis of values stored in fields of each candidate field combination of the plurality of the candidate field combinations is performed. Foreign keys between the first table and the second table are identified, based on a result of the statistical analysis.

DETAILED DESCRIPTION

Figure 1:
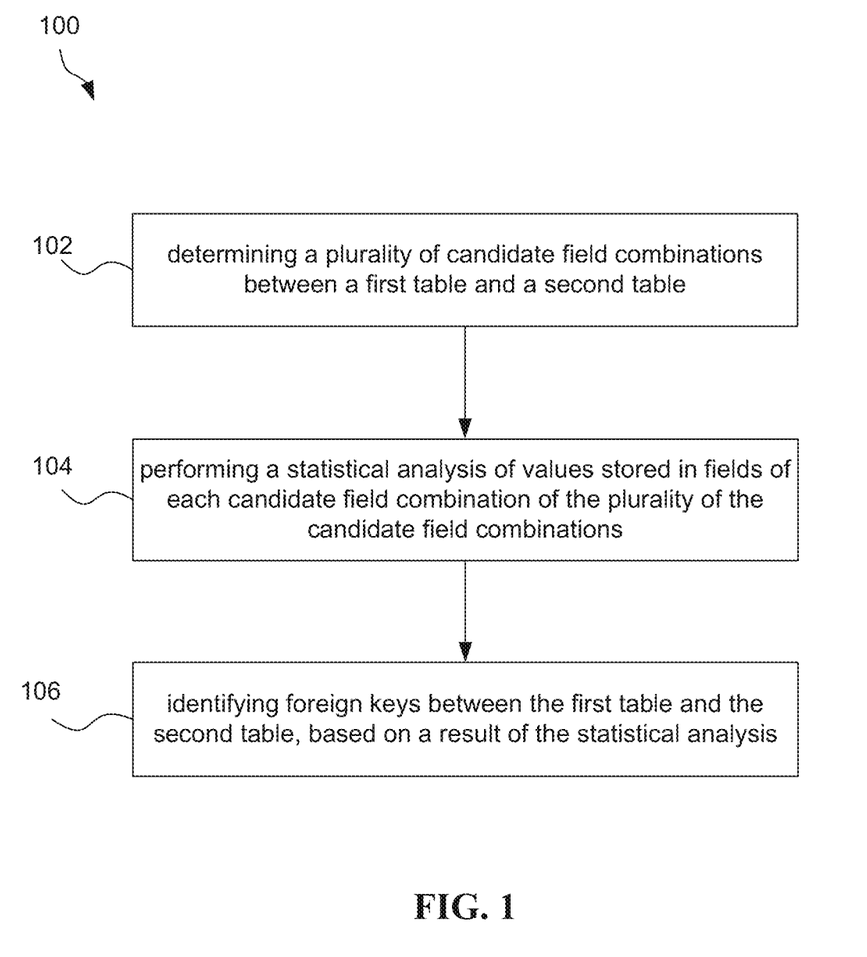
FIG. 1 illustrates a method for identifying foreign keys between distinct tables based on a statistical analysis of table values, in accordance with one embodiment.

FIG. 1 illustrates a method 100 for identifying foreign keys between distinct tables based on a statistical analysis of table values, in accordance with one embodiment. Thus, the method 100 may be used to determine existing, but unknown, foreign keys between the tables. The tables may be any separate tables in a same database or other data structure or in different databases/data structures. The tables have defined columns with at least some of the fields of each row being populated with data (values).

The method 100 may be performed any computer system described below with respect to FIGS. 6 and/or 7. For example, the method 100 may be performed by a computer system or combination of computer systems implemented as an echo system.

In operation 102, a plurality of candidate field combinations are determined between a first table and a second table. The candidate field combinations refer to different combinations of fields between the first and second tables. In case the foreign keys to be identified are simple foreign keys, the candidate field combinations may each include a field from the first table and a field from the second table. In case the foreign keys to be identified are composite foreign keys, the candidate field combinations may each include multiple fields from the first table and multiple fields from the second table. In general, the candidate field combinations are each a set of fields of size 1 to a maximum key size on each table.

In one embodiment, the candidate field combinations may be a subset of all field combinations between fields of the first table and the second table. In this embodiment, all (or some superset of) field combinations between fields of the first table and the second table may be generated. The field combinations may then be filtered to generate a set of candidate field combinations.

The filtering may be performed based on one or more parameters. In one embodiment, each candidate field combination may be evaluated per parameter and a score for the candidate field combination may be generated per parameter. When multiple parameters are used as the basis for evaluating a candidate field combination, the scores may be combined. Optionally, any defined weighting criteria may also be applied per score when combining the scores. Additionally, a field combination may be selected as a candidate field combination when the score generated for the field combination exceeds a threshold, or as another example a predefined number of top scored field combinations may be selected as the candidate field combinations.

In one embodiment, the parameters may include data entropy between fields of the field combination. For example, only fields with entropy values, such as Shannon entropy, above a predefined threshold may be considered as candidate field combinations. Joint Shannon entropy, or any other entropy measure, may be calculated for each field combination in each table of the table pair (e.g. for composite foreign key identification). Combinations with entropy values above a predefined threshold may be deemed candidates. It may also be validated that no candidate field combination can be split into candidate subsets of combinations.

In another embodiment, the parameters may include data characteristics between fields of the field combination. The data characteristics may include field type. For example, for a field combination, when field(s) of the first table are of type that is different from fields the second table, the field combination may not be included as a candidate field combination (and thus will not be considered as the foreign key). The data characteristics may also include a combination of field type and value. For example, for a field combination having a field of type string, if the strings (values) are longer than some predefined length then the field is less likely to be part of the foreign key and the field combination will not be selected as a candidate field combination. The data characteristics may further include data properties. For example, for a field combination, the minimum value of the field from the first table may be required to be lower than or equal to the minimum value of the field the second table.

In yet another embodiment, the parameters may include table metadata (when available). Namely, the metadata may include field title and field values type. Just by way of example, fields in the first table with a title that includes predefined key words (e.g. "ID" and "Name") can be scored as a higher probability to be a foreign key. Fields in the second table with title that include predefined key words (e.g. "Type"), can be scored as a higher probability to be part of the foreign key. As another option, a field in the second table with a title that refers to a field title in the first table can be scored as a higher probability to be in the foreign key. As another example, fields between the tables that are labeled the same are more likely to hold the same information. Fields in the first table with a title matching a field title in the second table may be scored as a higher probability to be in the foreign key.

In operation 104, a statistical analysis of values stored in fields of each candidate field combination of the plurality of the candidate field combinations is performed. The statistical analysis may differ depending on whether the foreign keys are being identified as simple foreign keys, namely single fields in each of the first table and the second table, or whether the foreign keys are being identified as composite foreign keys, namely multiple fields in each of the first table and the second table.

In the case of identifying simple foreign keys, the statistical analysis may be a function of: a count of distinct values in a field of the first table included in the candidate field combination, a count of distinct values in a field of the second table included in the candidate field combination, and a count of distinct common values that are both in the field of the first table and the field of the second table. More exemplary details regarding such statistical analysis will be described below with reference to FIG. 2.

In the case of identifying composite foreign keys, the statistical analysis may be a function of: a count of distinct value combinations in a combination of fields of the first table included in the candidate field combination, a count of distinct values combinations in a combination of fields of the second table included in the candidate field combination, and a count of distinct common value combinations that are both in the combination of fields of the first table and the combination of fields of the second table. More exemplary details regarding such statistical analysis will be described below with reference to FIG. 3.

In any case, the result of the statistical analysis may be a score for the candidate field combination.

In operation 106, foreign keys between the first table and the second table are identified, based on a result of the statistical analysis. For example, the foreign keys may be identified as the candidate field combination having the highest score resulting from the statistical analysis.

As an option, the foreign keys may further be identified based on a cardinality determined between fields of each candidate field combination, in the case of identifying simple foreign keys, or determined between the combination of fields of the first table included in the candidate field combination and the combination of fields of the second table included in the candidate field combination, in the case of identifying composite foreign keys. For example, in the case of simple foreign keys, any candidate field combination having fields with an N-N cardinality may be discarded from consideration as the foreign keys. In the case of composite foreign keys, any candidate field combination having an N-N cardinality may be discarded from consideration as the foreign keys.

To this end, the method 100 may be used to identify simple foreign keys between distinct tables and may also be used to identify composite foreign keys between distinct tables. Additionally, the method 100 may be used to identify the foreign keys from statistical analysis of the values included in the distinct tables, without necessarily relying on any metadata for such tables.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
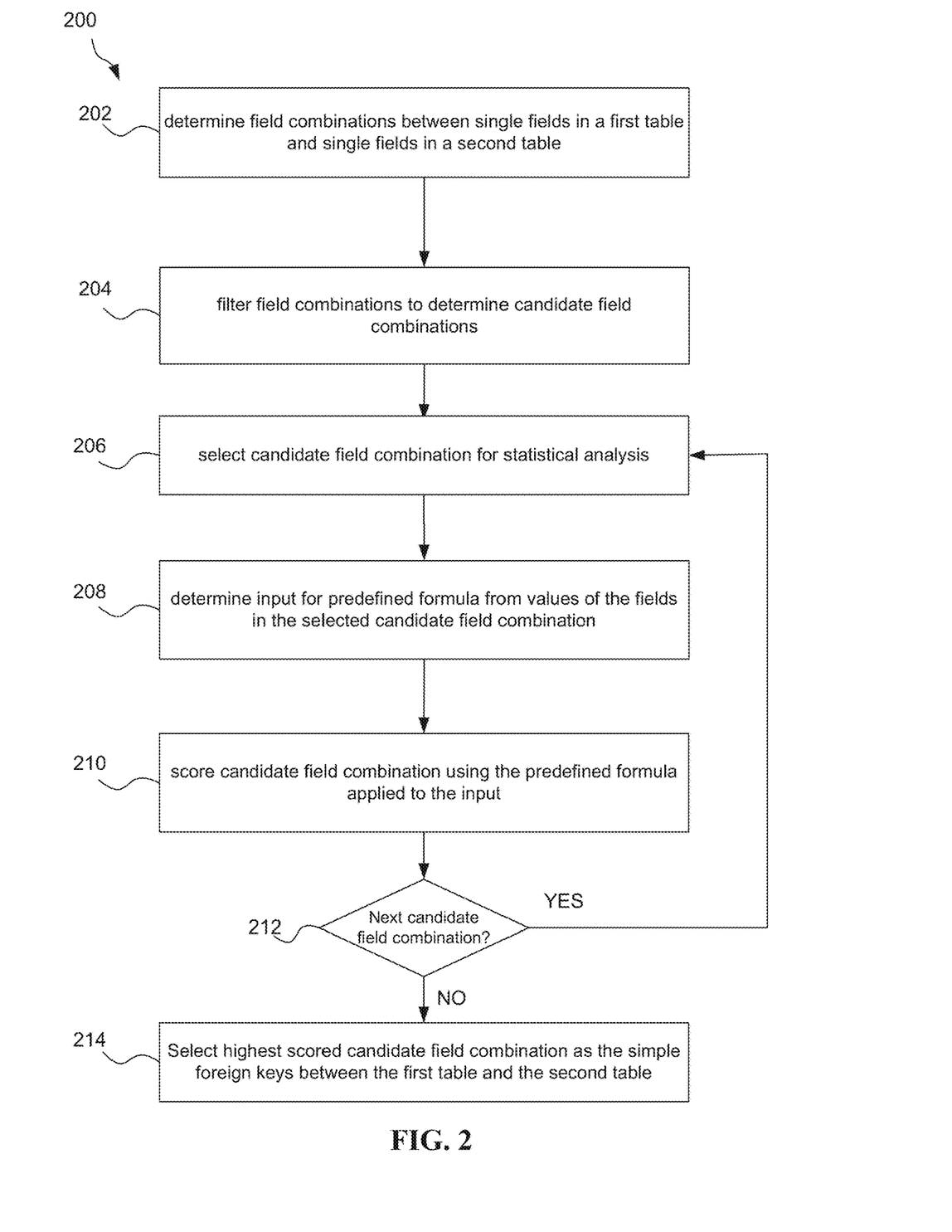
FIG. 2 illustrates a method for identifying simple foreign keys between distinct tables based on a statistical analysis of table values, in accordance with one embodiment.

FIG. 2 illustrates a method 200 for identifying simple foreign keys between distinct tables based on a statistical analysis of table values, in accordance with one embodiment. As an option, the method 200 may be carried out in the context of the details of the method 100 of FIG. 1. Of course, however, the method 200 may be carried out in the context of any desired environment. Further, the aforementioned definitions may equally apply to the description below.

In operation 202, field combinations between single fields in a first table and single fields in a second table are determined. In other words, the field combinations may include all possible combinations (permutations) of a single field of the first table and a single field of the second table.

In operation 204, the field combinations are filtered to determine candidate field combinations. The filtering parameters may be used to select a subset of the field combinations that are most likely (probable) to be the foreign keys between the first and second tables. The selected subset may be identified as the candidate field combinations.

In one embodiment, the filtering parameters may rely on the values of the fields in the field combinations. For example, the parameters may include data entropy and/or data characteristics. In another embodiment, the filtering parameters may rely on metadata identified for the fields in the field combinations. For example, the parameters may include field naming (e.g. title and/or type). More detailed examples of these parameters are described above with respect to the method 100 of FIG. 1.

In operation 206, a candidate field combination is selected for statistical analysis. In operation 208, input for a predefined formula is determined from values of the fields included in the candidate field combination. The input includes a count of distinct values in the field of the first table included in the candidate field combination is determined, a count of distinct values in the field of the second table included in the candidate field combination is determined, and a count of distinct common values that are in both the field of the first table and the field of the second table are determined.

In operation 210, each candidate field combination is scored using the predefined formula applied to the input. Table 1 illustrates a formula that can be used for the statistical analysis, and in particular used to score the candidate field combination, where field A refers to the field in the first table included in the candidate field combination and field B refers to the field in the second table included in the candidate field combination.

TABLE 1

$$FKS(A, B) = \frac{\|(A, B)\|}{\min(\|A\|, \|B\|)}$$

where:
|A| is the count of distinct values in field A;
|B| is the count of distinct values in field B; and
|(A,B)| is the count of distinct common values that are both in field A and in field B.

Table 2 illustrates exemplary data used by the statistical analysis.

TABLE 2

| Value | Frequency of value in field A | Frequency of value in field B |
|---|---|---|
| V1 | 4 | 1 |
| V2 | 1 | 1 |
| V3 | 3 | 1 |
| V4 | 1 | 1 |
| V5 | 1 | 1 |
| V6 | 1 | 0 |
| V7-V17 | 0 | 1 per value |

With regards to the data in Table 2, |A|=6, as field A has 6 values V1-V6; |B|=16 as field B has 16 values, V1-V17, except V6; and |(A,B)|=5 is the number of common values that are both in field A and in field B, that is V1-V5. Accordingly, the score generated for the candidate field combination A, B by the statistical analysis is: $FKS(A,B)=|(A,B)|/\min_T(OM, OBO)=5/\min_T(6,16)=5/6$.

In decision 212, it is determined whether there is a next candidate field combination to be selected for statistical analysis. Response to determining that there is a next candidate field combination to be selected for statistical analysis, the method 200 returns to operation 206. Responsive to determining that there is not a next candidate field combination to be selected for statistical analysis, the method 200 proceeds to operation 214 where a highest scored candidate field combination is selected as the simple foreign keys between the first and second tables.

In the example in Table 1, field B is a key, as it has frequencies of 1. Field A has the values as in B, except for V6. If V6 was also in field B, then the score FKS would have been 1—a perfect match indicating that the candidate field combination is definitively the foreign keys between the first and second tables.

The mapping may be used to decide upon the cardinality. N-N cardinality field combinations will be disregarded. Some sensitivity to data discrepancy may also be embedded in the statistical analysis such that "uniqueness" is defined as a frequency of unique values above a predefined threshold. Table 1 demonstrated a 1-N cardinality.

If FKS(A,B) is higher than a pre-defined threshold and the cardinality is not N-N, then the fields from both tables in the candidate field combination are selected as the foreign keys.

Figure 3:
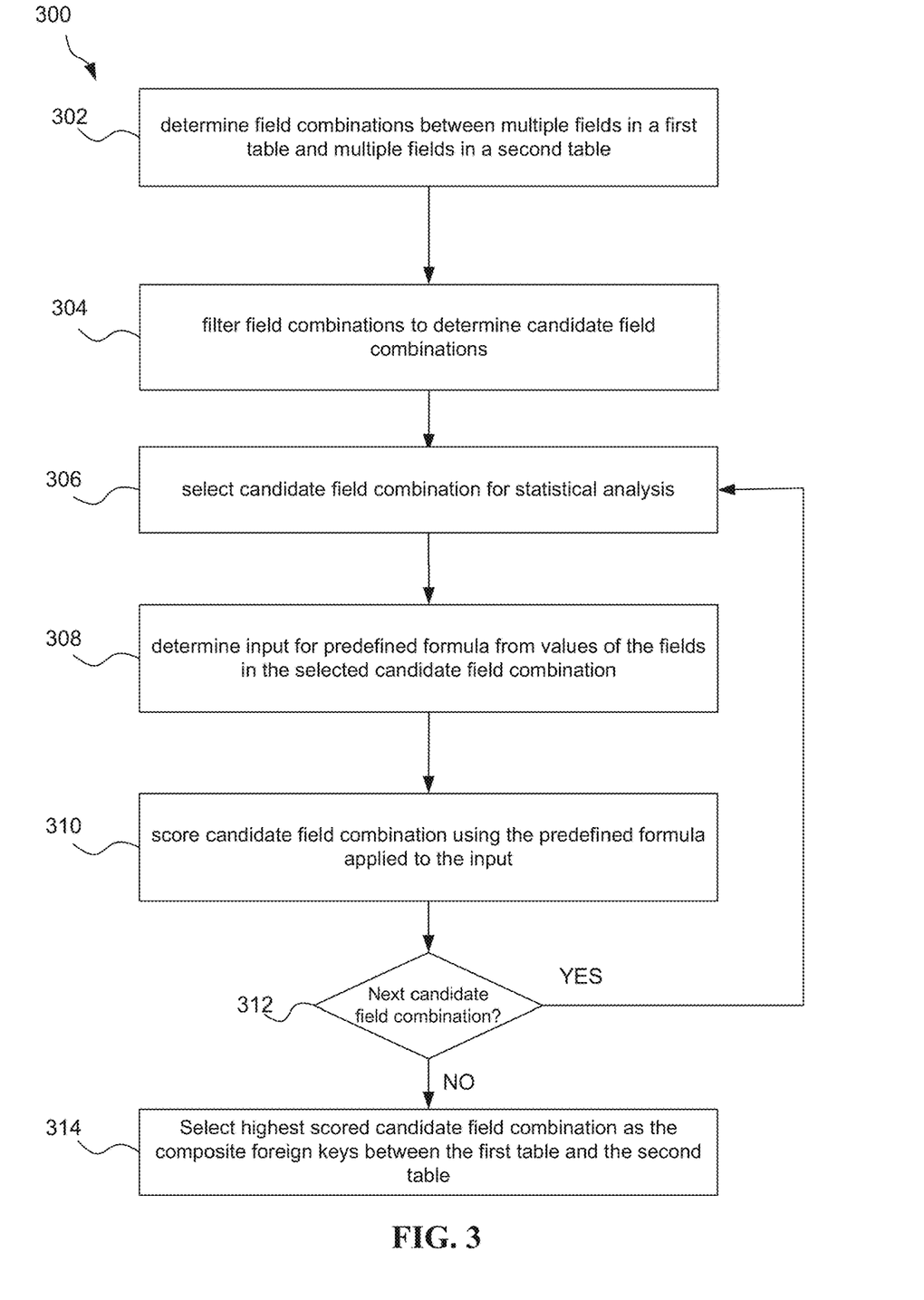
FIG. 3 illustrates a method for identifying composite foreign keys between distinct tables based on a statistical analysis of table values, in accordance with one embodiment.

FIG. 3 illustrates a method 300 for identifying composite foreign keys between distinct tables based on a statistical analysis of table values, in accordance with one embodiment. As an option, the method 300 may be carried out in the context of the details of the method 100 of FIG. 1. Of course, however, the method 300 may be carried out in the context of any desired environment. Further, the aforementioned definitions may equally apply to the description below.

In operation 302, field combinations between multiple fields in a first table and multiple fields a second table are determined. The field combinations may include all possible combinations (permutations) of N fields of the first table and N fields of the second table, where N>1.

In operation 304, the field combinations are filtered to determine candidate field combinations. The filtering parameters may be used to select a subset of the field combinations that are most likely (probable) to be the foreign keys between the first and second tables. The selected subset may be identified as the candidate field combinations.

In one embodiment, the filtering parameters may rely on the values of the fields in the field combinations. For example, the parameters may include data entropy and/or data characteristics. In another embodiment, the filtering parameters may rely on metadata identified for the fields in the field combinations. For example, the parameters may include field naming (e.g. title and/or type). More detailed examples of these parameters are described above with respect to the method 100 of FIG. 1.

In operation 306, a candidate field combination is selected for statistical analysis. In operation 308, input for a predefined formula is determined from values of the fields included in the candidate field combination. The input includes a count of distinct value combinations in a combination of fields of the first table included in the candidate field combination, a count of distinct values combinations in a combination of fields of the second table included in the candidate field combination, and a count of distinct common value combinations that are both in the combination of fields of the first table and the combination of fields of the second table.

In operation 310, each candidate field combination is scored using the predefined formula applied to the input. The formula illustrated in Table 1 can be used for the statistical analysis, and in particular used to score the candidate field combination. In the present embodiment, however, $A=(A_1, A_2, \ldots, A_n)$, $B=(B_1, B_2, \ldots, B_n)$.

Table 3 illustrates exemplary data used by the statistical analysis, including in particular values (A) for the combination of fields (A1, A2) of the first table included in the candidate field combination.

TABLE 3

| A1 | A2 | A |
|---|---|---|
| V1 | U1 | (V1, U1) |
| V2 | U2 | (V2, U2) |
| V3 | U1 | (V3, U1) |
| V1 | U2 | (V1, U2) |
| V3 | U2 | (V3, U2) |

TABLE 3-continued

| A1 | A2 | A |
|----|----|----|
| V1 | U2 | (V1, U2) |
| V3 | U1 | (V3, U1) |
| V1 | U2 | (V1, U2) |

Table 4 illustrates the count frequency for each A value from Table 3.

TABLE 4

| Value | A Frequency |
|-------|-------------|
| (V1, U1) | 1 |
| (V1, U2) | 3 |
| (V2, U2) | 1 |
| (V3, U1) | 2 |
| (V3, U2) | 1 |

The process illustrates in Tables 3 and 4 is repeated for values (B) for the combination of fields (B1, B2) of the second table included in the candidate field combination.

Once the mappings are derived for both combinations (A and B) they are merged to yield a unified mapping, as shown for example in Table 5.

TABLE 5

| Value | A Frequency | B Frequency |
|-------|-------------|-------------|
| (V1, U1) | 1 | 1 |
| (V1, U2) | 3 | 1 |
| (V2, U1) | 0 | 1 |
| (V2, U2) | 1 | 1 |
| (V3, U1) | 2 | 1 |
| (V3, U2) | 1 | 0 |

Then, FKS can be calculated as described in Table 1. For example, using Table 5:

$$FKS(A, B) = \frac{\|(A, B)\|}{\min(\|A\|, \|B\|)} = \frac{4}{\min(5, 5)} = \frac{5}{5}$$

In decision 312, it is determined whether there is a next candidate field combination to be selected for statistical analysis. Response to determining that there is a next candidate field combination to be selected for statistical analysis, the method 300 returns to operation 306. Responsive to determining that there is not a next candidate field combination to be selected for statistical analysis, the method 300 proceeds to operation 314 where a highest scored candidate field combination is selected as the composite foreign keys between the first and second tables.

For example, similar to method 200, if FKS(A, B) is higher than a pre-defined threshold and the cardinality is not N-N, the field combinations from both tables for the candidate field combination are selected as the foreign keys.

Additional Embodiments

Handling and manipulating string values is computationally inefficient. An execution-time improvement to the statistical analysis (scoring) described above can be achieved using numerical representations of the fields' values.

Basic Hashing

Figure 4A:
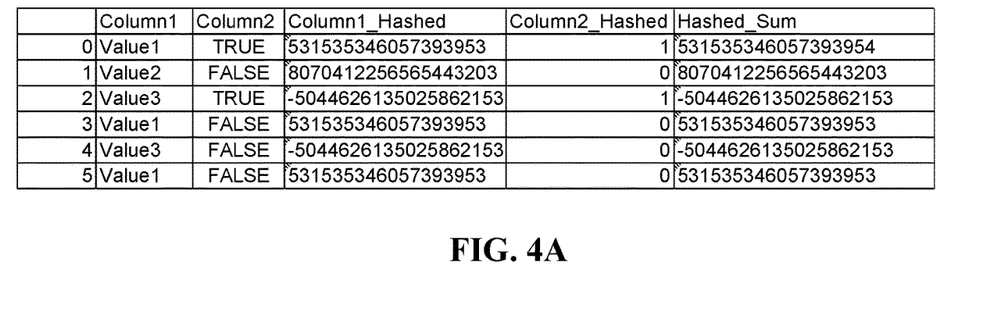
FIGS. 4A-C illustrate embodiments related to a basic hashing technique, in accordance with various embodiments.

A candidate field combination is derived where each candidate field combination consists of a field combination in table 1 and a field combination in table 2. The candidate field combination is evaluated as the foreign keys as follows:

For each combination within the candidate field combination, N-bit (typically, 16) integer hashing of the distinct values is performed and summed across the fields to generate a hashed representation of a distinct composite key value (see for example FIG. 4A).

Figure 4B:
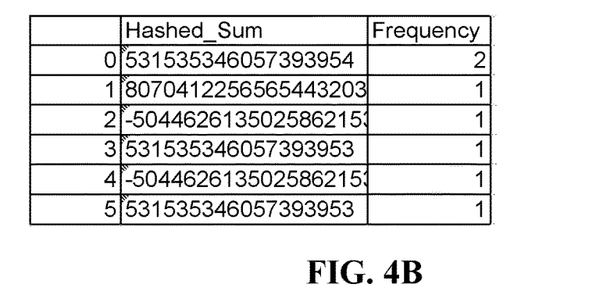
Figure 4C:
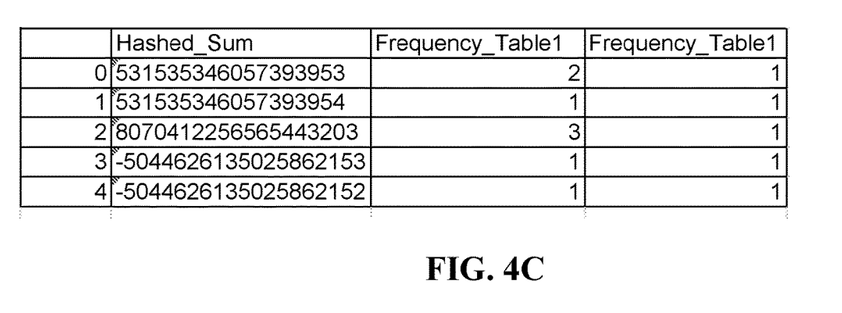

Then, a mapping between each distinct hashed summary and its occurrence frequency in the table is generated (see for example FIG. 4B). Further, once the mappings are derived for both combinations they are merged to yield unified mapping, where only common summarized hashing values are merged (see for example FIG. 4C).

The mapping is being used to decide upon the cardinality. N-N cardinality candidate field combinations are being disregarded. Some sensitivity to data discrepancy is embedded in the model such that "uniqueness" is defined as frequency of unique values above a predefined threshold. The table shown in FIG. 4C demonstrated a 1-N cardinality.

FKS is calculated as described in Table 1. If FKS is higher than a pre-defined threshold and the cardinality is not N-N the fields from both tables in the candidate field combination are selected as the foreign keys.

Pigeonhole Hashing-Based Filter

Further execution time reduction for the statistical analysis can be achieved by generating a fixed-sized vector representation for each field and performing a bit-wise comparison, which is faster than the "group-by" operation demonstrated in FIG. 4B.

The following process is repeated for each field in each table, and thereby generating a fixed-sized logical vector representation:

1) Each distinct value in the field is converted to an N-bit (typically, 16) integer using a hashing function. Let us denote the hashed representation of distinct value V of field C as $VC_i$.

2) A K-sized Boolean vector (K is pre-assigned and dependent on the choice of N) is initialized, all values are set to "False" by default.

3) Let us denote the remainder value from the division of the VCS by K as VC/(modulo operator). The index of $VC_i$ in the k-sized vector is set to True for all distinct values in the field.

Figure 5:
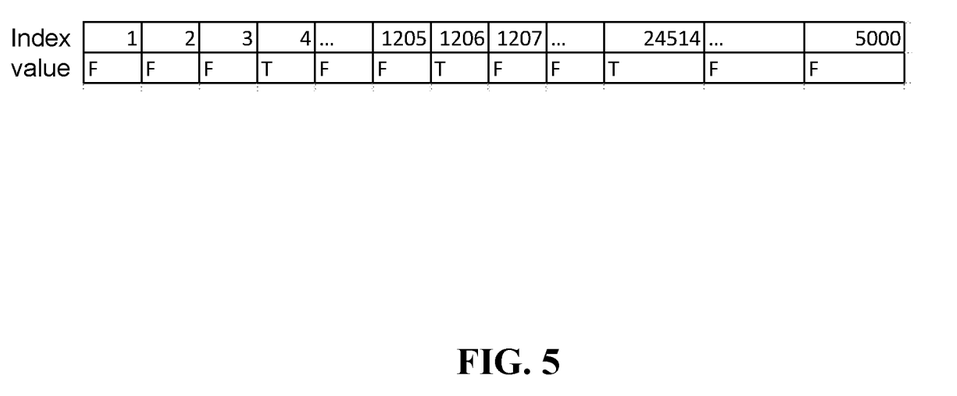
FIG. 5 illustrates a fixed-sized logical vector representation, in accordance with one embodiment.

FIG. 5 illustrates a fixed-sized logical vector representation.

To devise a representation of a field combination $VC_i$ can now be defined as the sum of the hashed values (as demonstrated in FIG. 4A). Once defined, steps 2) and 3) are performed.

Comparing field combination from table 1 and field combination from table 2 (together forming the candidate field combination) for foreign key is done via comparing their corresponding logical vector representations. A comparison score is calculated using a Jaccard similarity coefficient (Intersection over union), or other equivalent method such as F1-score, between the logical vector representations of the field combinations.

If the comparison score is above a predefined threshold the candidate field combination is selected as foreign keys.

The above description does not account for cardinality. Value frequencies for each field combination is calculated separately to derive cardinality. N-N cardinality candidate field combinations are being disregarded. Some sensitivity to data discrepancy is embedded in the model such that "uniqueness" is defined as frequency of unique values above a predefined threshold.

Multiple representations, corresponding to multiple hashing functions (i.e. SHA-family, MurmurHash), may be performed to decrease the chance of misrepresenting unique values/combinations where their hashing values, by chance, have the same remainder values as other combinations.

CONCLUSION

To this end, the embodiments described above identify foreign keys based on field values, and having metadata (such as column name) as an optional additional parameter to consider. The embodiments described above also identify foreign keys that are a combination of several columns, and not a single column. The embodiments described above additionally identify foreign keys based on field values, even if there are some errors in the data and there is no full match. The embodiments described above can process the two tables jointly, not assuming that one is the primary key and the other table referring to it. The embodiments described above further provide a very efficient solution in comparing string values using the hashing techniques described above.

Figure 6:
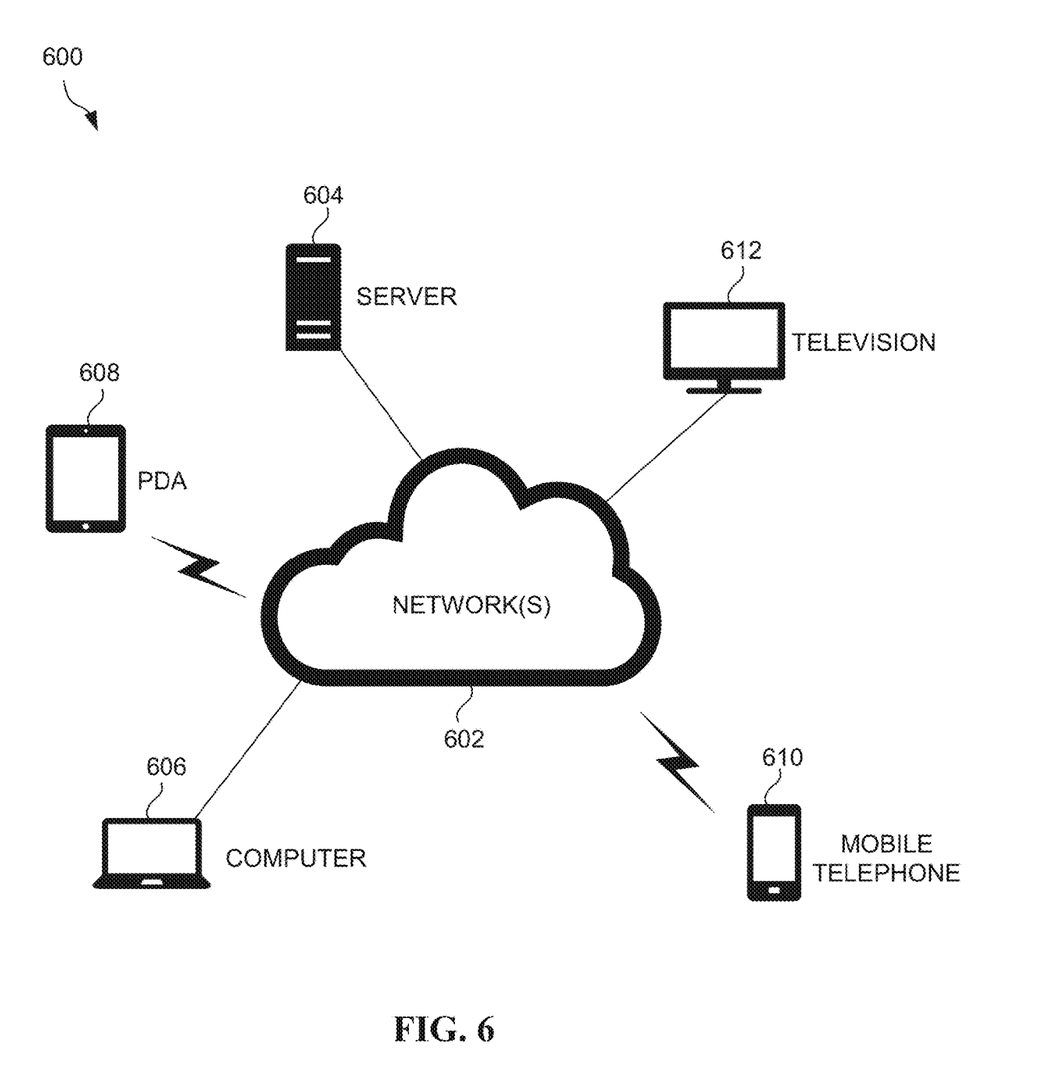
FIG. 6 illustrates a network architecture, in accordance with one possible embodiment.
Figure 7:
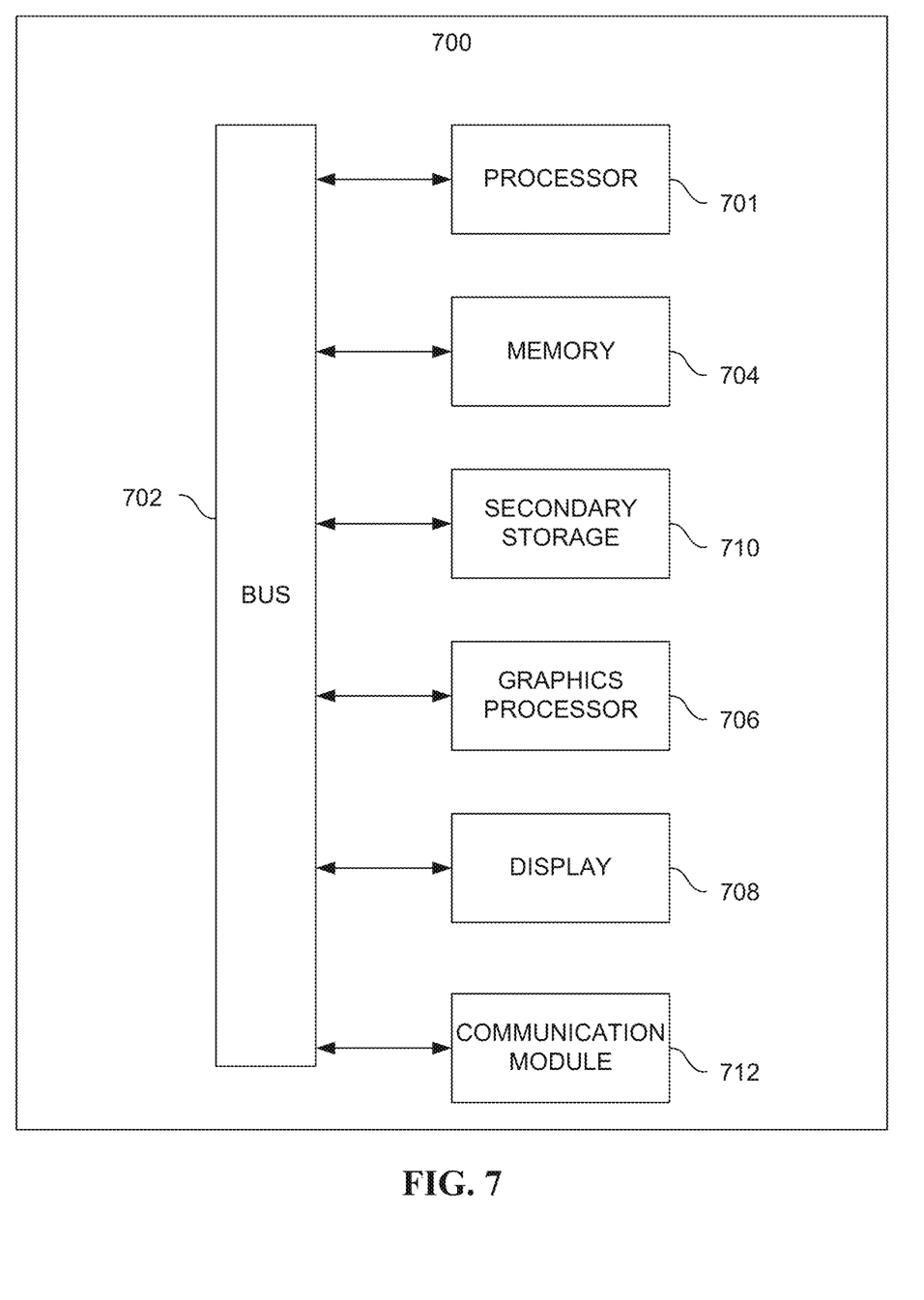
FIG. 7 illustrates an exemplary system, in accordance with one embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   generating all field combinations between fields of a first table and a second table;
   filtering the field combinations to generate a set of candidate field combinations between the first table and the second table, the filtering including:
   generating a score for each field combination based on one or more parameters, and
   one of:
     selecting the field combination as a candidate field combination when the score generated for the field combination exceeds a threshold, or
     selecting a predefined number of top scored field combinations as the candidate field combinations;
   performing a statistical analysis of values stored in fields of each candidate field combination of the plurality of the candidate field combinations; and
   identifying foreign keys between the first table and the second table, based on a result of the statistical analysis.

2. The non-transitory computer readable medium of claim 1, wherein the one or more parameters includes data entropy between fields of the field combination.

3. The non-transitory computer readable medium of claim 1, wherein the one or more parameters includes data characteristics between fields of the field combination.

4. The non-transitory computer readable medium of claim 1, wherein the foreign keys are single fields in the first table and the second table.

5. The non-transitory computer readable medium of claim 4, wherein the statistical analysis is a function of:
   a count of distinct values in a field of the first table included in the candidate field combination,
   a count of distinct values in a field of the second table included in the candidate field combination, and
   a count of distinct common values that are both in the field of the first table and the field of the second table.

6. The non-transitory computer readable medium of claim 5, wherein the result of the statistical analysis is a score for the candidate field combination.

7. The non-transitory computer readable medium of claim 6, wherein the foreign keys are further identified based on a cardinality determined between fields of each candidate field combination.

8. The non-transitory computer readable medium of claim 7, wherein any candidate field combination having fields with an N-N cardinality are discarded from consideration as the foreign keys.

9. The non-transitory computer readable medium of claim 6, wherein one of the candidate field combinations with a highest score resulting from the statistical analysis is identified as the foreign keys between the first table and the second table.

10. The non-transitory computer readable medium of claim 1, wherein the foreign keys are composite fields in the first table and the second table.

11. The non-transitory computer readable medium of claim 10, wherein the statistical analysis is a function of:
    a count of distinct value combinations in a combination of fields of the first table included in the candidate field combination,
    a count of distinct values combinations in a combination of fields of the second table included in the candidate field combination, and a count of distinct common value combinations that are both in the combination of fields of the first table and the combination of fields of the second table.

12. The non-transitory computer readable medium of claim 11, wherein the result of the statistical analysis is a score for the candidate field combination.

13. The non-transitory computer readable medium of claim 12, wherein the foreign keys are further identified based on a cardinality determined between the combination of fields of the first table included in the candidate field combination and the combination of fields of the second table included in the candidate field combination.

14. The non-transitory computer readable medium of claim 13, wherein any candidate field combination having an N-N cardinality are discarded from consideration as the foreign keys.

15. The non-transitory computer readable medium of claim 12, wherein one of the candidate field combinations with a highest score resulting from the statistical analysis is identified as the foreign keys between the first table and the second table.

16. A method, comprising:
   determining a plurality of candidate field combinations between a first table and a second table;
   performing a statistical analysis of values stored in fields of each candidate field combination of the plurality of the candidate field combinations, wherein the statistical analysis is a function of:
      a count of distinct values in a field of the first table included in the candidate field combination,
      a count of distinct values in a field of the second table included in the candidate field combination, and
      a count of distinct common values that are both in the field of the first table and the field of the second table; and
   identifying foreign keys between the first table and the second table, based on a result of the statistical analysis, wherein the foreign keys are single fields in the first table and the second table.

17. A system, comprising:
a non-transitory memory storing instructions; and
one or more processors in communication with the non-transitory memory that execute the instructions to perform a method comprising:
determining a plurality of candidate field combinations between a first table and a second table;
performing a statistical analysis of values stored in fields of each candidate field combination of the plurality of the candidate field combinations, wherein the statistical analysis is a function of:
   a count of distinct value combinations in a combination of fields of the first table included in the candidate field combination,
   a count of distinct values combinations in a combination of fields of the second table included in the candidate field combination, and
   a count of distinct common value combinations that are both in the combination of fields of the first table and the combination of fields of the second table; and
identifying foreign keys between the first table and the second table, based on a result of the statistical analysis, wherein the foreign keys are composite fields in the first table and the second table.

* * * * *